(12) United States Patent
Marent (10) Patent No.: US 10,779,376 B2
(45) Date of Patent: Sep. 15, 2020

(54) LUMINAIRE BUS SYSTEM

(71) Applicant: TRIDONIC GMBH & CO KG, Dornbirn (AT)

(72) Inventor: Günter Marent, Bartholomäberg (AT)

(73) Assignee: TRIDONIC GMBH & CO KG, Dornbirn (AT)

( * ) Notice: Subject to any disclaimer, the term of this patent is extended or adjusted under 35 U.S.C. 154(b) by 0 days.

(21) Appl. No.: 16/466,333

(22) PCT Filed: Dec. 18, 2017

(86) PCT No.: PCT/EP2017/083342
§ 371 (c)(1),
(2) Date: Jun. 4, 2019

(87) PCT Pub. No.: WO2018/114817
PCT Pub. Date: Jun. 28, 2018

(65) Prior Publication Data
US 2020/0084857 A1  Mar. 12, 2020

(30) Foreign Application Priority Data

Dec. 19, 2016 (DE) .................. 10 2016 225 495

(51) Int. Cl.
| | |
|---|---|
| *H05B 45/37* | (2020.01) |
| *H05B 47/10* | (2020.01) |
| *H02M 7/00* | (2006.01) |
| *H05B 45/10* | (2020.01) |

(Continued)

(52) U.S. Cl.
CPC ................ *H05B 47/10* (2020.01); *H02J 1/00* (2013.01); *H02M 7/219* (2013.01); *H05B 45/10* (2020.01); *H05B 45/37* (2020.01)

(58) Field of Classification Search
CPC ........ H05B 47/10; H05B 45/10; H05B 45/37; H02J 1/00; H02M 7/219
See application file for complete search history.

(56) References Cited

U.S. PATENT DOCUMENTS

2006/0022214 A1* 2/2006 Morgan ................. H05B 45/50
257/99
2012/0297104 A1  11/2012 Thottuvelil et al.
(Continued)

OTHER PUBLICATIONS

German search report dated Oct. 2, 2017 in priority German application 10 2016 225 495.2.
(Continued)

*Primary Examiner* — Henry Luong
(74) *Attorney, Agent, or Firm* — Andrus Intellectual Property Law (57) ABSTRACT

The aim of the invention is to determine an operating point (220) of an AC/DC converter and optionally of a DC/DC converter, fed by the AC/DC converter, for feeding an operating DC voltage into a luminaire bus system in such a way that a power loss (202) of the luminaire bus system is reduced. This aim is achieved according to the invention in that a plurality of calibration DC voltages (282) are sequentially fed into the luminaire bus system, and a corresponding power consumption of the luminaire bus system is determined for each calibration DC voltage (282). The operating point can then be determined based on the power consumptions.

11 Claims, 8 Drawing Sheets

(51) Int. Cl.
*H02J 1/00* (2006.01)
*H02M 7/219* (2006.01)

(56) References Cited

U.S. PATENT DOCUMENTS

| | | | | |
|---|---|---|---|---|
| 2015/0327340 A1* | 11/2015 | Siessegger | ............ | H05B 45/327 |
| | | | | 315/200 R |
| 2015/0359074 A1* | 12/2015 | Panguloori | .......... | H05B 47/105 |
| | | | | 315/297 |
| 2017/0110905 A1* | 4/2017 | Simmet | .................. | H05B 45/50 |

OTHER PUBLICATIONS

International Search Report dated Mar. 12, 2018 in parent PCT application PCT/EP2017/083342.

\* cited by examiner

LUMINAIRE BUS SYSTEM

CROSS REFERENCE TO RELATED APPLICATIONS

The present application is the U.S. national stage application of international application PCT/EP2017/083342 filed Dec. 18, 2017, which international application was published on Jun. 28, 2018 as international publication WO 2018/114817 A1. The international application claims priority to German patent application 10 2016 225 495.2 filed Dec. 19, 2016.

FIELD OF THE INVENTION

Various embodiments of the invention relate in general to the determination of an operating point of an AC/DC converter for a luminaire bus system. Various embodiments of the invention in particular relate to the determination of the operating point based on a power consumption of the luminaire bus system.

BACKGROUND OF THE INVENTION

Technologies for supplying energy to several luminaires by means of a luminaire bus system are known. It is possible for a DC voltage to be transmitted to the luminaires via the luminaire bus system. Such an implementation of a luminaire bus system with an operating DC voltage (DC string) has the advantage that it can be unnecessary to provide a separate AC/DC converter for each luminaire. This can reduce the complexity of the individual luminaires; in addition, the luminaires can often be provided with smaller dimensions.

However, such technologies frequently have certain disadvantages and restrictions. For example, a branched system architecture of the luminaire bus system can result in a complex power loss network. This can in particular apply to such luminaire bus systems that use a comparatively low operating DC voltage, for example with an amplitude of less than 60 V. The power loss can in this case be predetermined by the system architecture in some examples; It can however optionally occur that the design reserves result in a non-optimal selection of the operating DC voltage with respect to the power loss. Such problems can in particular arise in connection with comparatively simple lighting systems in which no or only one restricted communication possibility is available between the individual luminaires.

SUMMARY OF THE INVENTION

A need for improved technologies for operating a luminaire bus system therefore exists. There is in particular a need for technologies that eliminate or reduce at least some of the aforementioned disadvantages and restrictions.

This aim is achieved by the features of the independent claims. The features of the dependent claims define embodiments.

In one example, a method comprises the controlling of an AC/DC converter to feed a plurality of calibration DC voltages sequentially into a luminaire bus system. The AC/DC converter can feed the calibration DC voltages to one or more DC/DC converters as part of the luminaire bus system. In this case, the method comprises for each calibration DC voltage: determining a corresponding power consumption of the luminaire bus system. The method furthermore comprises the determination of an operating point of the AC/DC converter and of the DC/DC converters based on the power consumptions. The method moreover comprises the controlling of the AC/DC converter to feed an operating DC voltage into the luminaire bus system in accordance with the operating point.

For example, the AC/DC converter could comprise a rectifier that converts an AC input voltage into a DC voltage. For example, the AC/DC converter could comprise a step-up converter or a step-down converter that is arranged in the DC regime of the AC/DC converter. A valley fill circuit could, for example, be used. The AC/DC converter could, for example, have a smoothing filter, etc. The AC/DC converter can be designed to output a DC voltage with variable amplitude. To this end, the switching frequency of a switching element of a step-up or step-down converter could, for example, be adjusted.

The calibration DC voltages can have different amplitudes. This can make it possible to sample the power consumptions for a given operating range of the AC/DC converter and of the DC/DC converters. The power consumption can be characterized as a function of the operating point of the bus system. The calibration DC voltages can be used in a calibration phase, i.e., outside of the intended operation, for example.

The luminaire bus system is also often referred to as DC luminaire bus system because it is designed to transmit DC voltages for operating luminaires. The luminaire bus system can comprise one or more conductors. For example, a signal conductor and an earth conductor can respectively be provided. The integral conductor length of the luminaire bus system per AC/DC converter can, for example, be in the range of a few meters up to a few hundred meters. Typical luminaire bus systems can, for example, have an operating range of the operating DC voltage in the range of 12 V to 48 V or even 50 V to 250 V.

The luminaire bus system can, for example, be connected to one or more luminaires. For example, the luminaire bus system could be connected to a number of more than five luminaires, optionally of more than 20 luminaires, further optionally of more than 50 luminaires. In the various examples described herein, the most varied types of luminaires can be used. For example, light-emitting diodes, halogen lamps, gas discharge lamps, incandescent lamps, etc. could be used.

The power consumption of the luminaire bus system can correspond to a power output of the AC/DC converter. The power consumption of the luminaire bus system can comprise both a power loss as well as an operating power of the luminaires. For example, the power loss could be dissipated in the form of thermal energy in the region of the lines of the luminaire bus system. This can degrade the energy balance.

For example, the operating point could be characterized by the operating DC voltage. However, the operating point could alternatively or additionally also be characterized by a current flow. The operating point could alternatively or additionally also be characterized by a power consumption of the luminaire bus system.

For example, the technologies described herein can achieve that the operating point of the AC/DC converter and of the DC/DC converters is selected such that a particularly low power loss occurs during operation of the luminaire bus system with the operating DC voltage. The use of the plurality of calibration DC voltages can make it possible to characterize the power consumption of the luminaire bus system empirically in a given operating range of the AC/DC converter and of the DC/DC converters. In this way, it can be possible to achieve the particularly low power loss flexibly for different system architectures of the luminaire bus system. Moreover, elaborate manual optimization of the operating point can be omitted.

In some examples, the determination of the operating point can comprise an optimization of the power loss of the luminaire bus system.

For example, within the framework of the optimization, various optimization algorithms basically already known to the person skilled in the art can be used. It would optionally be possible for the optimization to take into account one or more boundary conditions. Examples of boundary conditions include, for example: operating parameters of DC/DC converters assigned to the luminaires; dimmer levels of the luminaires, etc.

Carrying out the optimization with respect to the power loss can achieve a particularly low-cost operation of the luminaire bus system. It can moreover be possible to determine the operating point flexibly and automatically. The optimization can make it possible to find the optimal operating point particularly precisely and particularly quickly.

It would, for example, be possible for a calibration phase to comprise the controlling of the AC/DC converter to sequentially feed the plurality of calibration DC voltages. An operating phase can furthermore comprise the controlling of the AC/DC converter to feed the operating DC voltage. The method can comprise the repeated triggering of the calibration phase and the repeated determination of the operating point for a respectively subsequently triggered operating phase.

It would, for example, be possible for the calibration phase and the operating phase to be respectively carried out alternately. An operating phase in which a respectively currently determined operating point is used by selecting the corresponding operating DC voltage can thus be assigned to each calibration phase.

By carrying out the calibration phase several times and repeatedly, dynamic effects can be taken into account. For example, the dependence of the power loss on the operating point of the AC/DC converter can have a drift as a function of time. It is also possible for the power loss to be dependent on the dimmer level of the luminaires connected to the luminaire bus system or to be dependent on other operating parameters. Such dependencies can be taken into account by repeatedly carrying out the calibration phase.

For example, the repeated triggering of the calibration phase could take place according to a predetermined time schedule. For example, the repeated triggering of the calibration phase could take place periodically. Typical time durations between the subsequent triggering of the calibration phase can, for example, be in the range of days, months, or weeks. On the one hand, the frequent triggering of the calibration phase can be desirable in order to take into account dynamic effects with respect to the optimal operating point of the AC/DC converter; on the other hand, it can however be desirable not to interrupt the normal operation of the luminaire bus system in the operating phase very frequently.

For example, the carrying out of the calibration phase could be triggered by one or more events. An example of an event can be the initialization of the luminaire bus system. The controlling of the AC/DC converter to feed the plurality of calibration DC voltages sequentially, i.e., for example, a calibration phase, could be triggered by an initialization of the luminaire bus system.

In this case, the initialization of the luminaire bus system could, for example, refer to putting the luminaire bus system into operation after a certain time period without power supply. The initialization of the luminaire bus system could, for example, refer to the first commissioning of the luminaire bus system.

Another event which could trigger the carrying out of the calibration phase would, for example, be the changing of a dimmer level of luminaires connected to the luminaire bus system. In this way, dependencies of the preferred operating point on the dimmer level can be taken into account.

In some examples, it would be possible for more than a single AC/DC converter to be used for operating the luminaire bus system. For example, two AC/DC converters arranged at different locations could be used. In this way, it can be possible to increase the reliability of the luminaire bus system. It can moreover be possible to achieve a distributed energy supply and thus an improved energy balance.

The method could furthermore comprise the controlling of an additional AC/DC converter to sequentially feed a plurality of additional calibration DC voltages into the luminaire bus system. The method could comprise for each of the plurality of calibration DC voltages the determination of a corresponding additional power consumption of the luminaire bus system. It would then be possible for the operating point of the AC/DC converter also to be determined based on the additional power consumptions.

The power loss of the luminaire bus system can typically depend on both the operating DC voltage that is provided by the AC/DC converter and the additional operating DC voltage that is provided by the additional AC/DC converter. It can therefore be desirable also to extend the parameter space of the optimization with respect to the power loss to the additional operating DC voltage provided by the additional AC/DC converter. The power loss can then be reduced to a particularly great extent.

For example, it would be possible in this respect for control data to be transmitted to an interface associated with the AC/DC converter and/or to an additional interface associated with the additional AC/DC converter. The control data can in this case cause a synchronization of the controlling of the AC/DC converter to feed the plurality of calibration DC voltages and of the controlling of the additional AC/DC converter to feed the plurality of additional calibration DC voltages.

For example, the interfaces of the AC/DC converters could use radio technology, power line communication (PLC), or another communication protocol. The control data can in this case be peer-to-peer communication between the two AC/DC converters; or communication of a central control device to the interfaces.

For example, switching could respectively take place in a chronologically synchronized manner between different calibration DC voltages and different additional calibration DC voltages. This means that pairs of calibration DC voltages can respectively be implemented at the AC/DC converters. In this way, it is possible for each given power consumption of the luminaire bus system to be associated both with a well-defined calibration DC voltage of the AC/DC converter and with a well-defined additional calibration DC voltage of the additional AC/DC converter. In this way, the parameter space of the optimization can be sampled particularly efficiently and quickly.

For example, it would be possible for the determination of the operating point of the AC/DC converter to comprise a global optimization of the power loss of the luminaire bus system in case of the supply by the AC/DC converter and the additional AC/DC converter. In other words, this can mean that the power loss is optimized not only with respect to the power consumption of the luminaire bus system at the AC/DC converter but also with respect to the power consumption of the luminaire bus system at the additional AC/DC converter. In this case, a coupled optimization for the various AC/DC converters can thus occur. The power loss can thus be reduced to a particularly great extent.

It would accordingly also be possible for an additional operating point of the additional AC/DC converter to be determined based on the power consumptions and also based on the additional power consumptions. The additional AC/DC converter could then be controlled to feed an additional operating DC voltage of the luminaire bus system in accordance with the additional operating point. For example, the operating point of the AC/DC converter could differ from the operating point of the additional AC/DC converter.

In other words, the global optimization can bring about an asymmetrical situation with respect to the energy supply provided by the AC/DC converter and the additional AC/DC converter for the luminaires connected to the luminaire bus system. As a result, the power loss of the luminaire bus system can then be reduced overall.

It would be possible in some examples for the operating point to describe the operating DC voltage explicitly. To this end, a quantitative indicator of a given length can, for example, be provided. For example, as a result of the optimization with respect to the power loss, a certain operating DC voltage can be determined, which is then used for the operation of the luminaire bus system.

In other examples, however, the operating point could describe a target power consumption of the luminaire bus system, for example with respect to a given AC/DC converter. The controlling of the AC/DC converter to feed the operating DC voltage could then take place in a regulated manner, wherein a reference variable determined based on the target power consumption is used and the operating DC voltage is used as control variable.

In another example, a computing unit is designed to carry out the following steps: controlling an AC/DC converter to feed a plurality of calibration DC voltages sequentially into a luminaire bus system; for each calibration DC voltage: determining a corresponding power consumption of the luminaire bus system; determining an operating point of the AC/DC converter based on the power consumptions; and controlling the AC/DC converter to feed an operating DC voltage into the luminaire bus system in accordance with the operating point.

In one example, a computer program product includes program code that can be executed by a computing unit. The execution causes the following steps to be processed: controlling an AC/DC converter to feed a plurality of calibration DC voltages sequentially into a luminaire bus system; for each calibration DC voltage: determining a corresponding power consumption of the luminaire bus system; determining an operating point of the AC/DC converter based on the power consumptions; and controlling the AC/DC converter to feed an operating DC voltage into the luminaire bus system in accordance with the operating point.

In one example, a computer program includes program code that can be executed by a computing unit. The execution causes the following steps to be processed: controlling an AC/DC converter to feed a plurality of calibration DC voltages sequentially into a luminaire bus system; for each calibration DC voltage: determining a corresponding power consumption of the luminaire bus system; determining an operating point of the AC/DC converter based on the power consumptions; and controlling the AC/DC converter to feed an operating DC voltage into the luminaire bus system in accordance with the operating point.

For example, the computing unit could be designed to carry out the method according to another example of the present invention. For such a computing unit, effects can be achieved that are comparable to effects that can be achieved for the method according to another example of the present invention.

In one example, a system comprises a computing unit and a luminaire bus system.

The system can, for example, also comprise luminaires that are connected to the luminaire bus system.

The invention also comprises a luminaire bus system, wherein the luminaire bus system is designed to carry out a method according to the invention.

The above-described features and features described below can be used not only in the corresponding, explicitly described combinations but also in other combinations or in isolation, without leaving the scope of protection of the present invention.

DETAILED DESCRIPTION

The above-described properties, features, and advantages of this invention as well as the manner in which they are achieved become clearer and more understandable in connection with the following description of the exemplary embodiments that are explained in more detail in connection with the drawings.

Hereinafter, the present invention is explained in more detail based on preferred embodiments with reference to the drawings. In the figures, the same reference symbols refer to identical or similar elements. The figures are schematic illustrations of various embodiments of the invention. Elements shown in the figures are not necessarily illustrated true to scale. Rather, the various elements shown in the figures are reproduced in such a way that their function and general purpose is comprehensible to the person skilled in the art. Connections and couplings shown in the figures between functional units and elements can also be implemented as indirect connection or coupling. A connection or coupling can be implemented in a wired or wireless manner. Functional units can be implemented as hardware, software, or a combination of hardware and software.

Below are described various technologies which make it possible to optimize the efficiency or power loss of a luminaire bus system. In this respect, it can be possible in the technologies described herein to optimize the power consumption in accordance with a given system architecture of the luminaire bus system. This means that the optimization can, for example, take into account the topology, the operating mode, and the design of the AC/DC converter and/or of DC/DC converters. Accordingly, it would, for example, be possible for the optimization to take into account given additional parameters of the system architecture, such as the geometry, length, and material of conductors of the luminaire bus system.

In various technologies described herein, the optimization of the power loss can take place by suitable selection of the operating DC voltages provided by an AC/DC converter or of the plurality of operating DC voltages provided by a plurality of AC/DC converters. In general, one or more operating points can be determined for one or more AC/DC converters. These technologies are based on the knowledge that the operating point of one or more AC/DC converters can frequently be changed at least within a certain tolerance without restricting the operation of the luminaires. Such a change of the operating point can however cause the power loss to be reduced.

In some examples, a preferred operating point can in this case be determined empirically for one or for each of a plurality of AC/DC converters. To this end, various calibration DC voltages can be used and the power consumption of the luminaire bus system can respectively be determined. An optimized operating DC voltage can, for example, be derived therefrom. For example, the operating DC voltage for the normal operation of the luminaire bus system could then be selected from the set of calibration DC voltages. It would however also be possible for the parameter space, which could be rather large, of the calibration DC voltages to be sampled in a targeted manner within the framework of an optimization. This can mean that the selection or variation of the calibration DC voltages takes place in a targeted manner by an optimization algorithm. A corresponding calibration phase can then be completed comparatively quickly. This makes possible the frequent repetition of the calibration phase and thus the precise consideration of changes over time.

Figure 1:
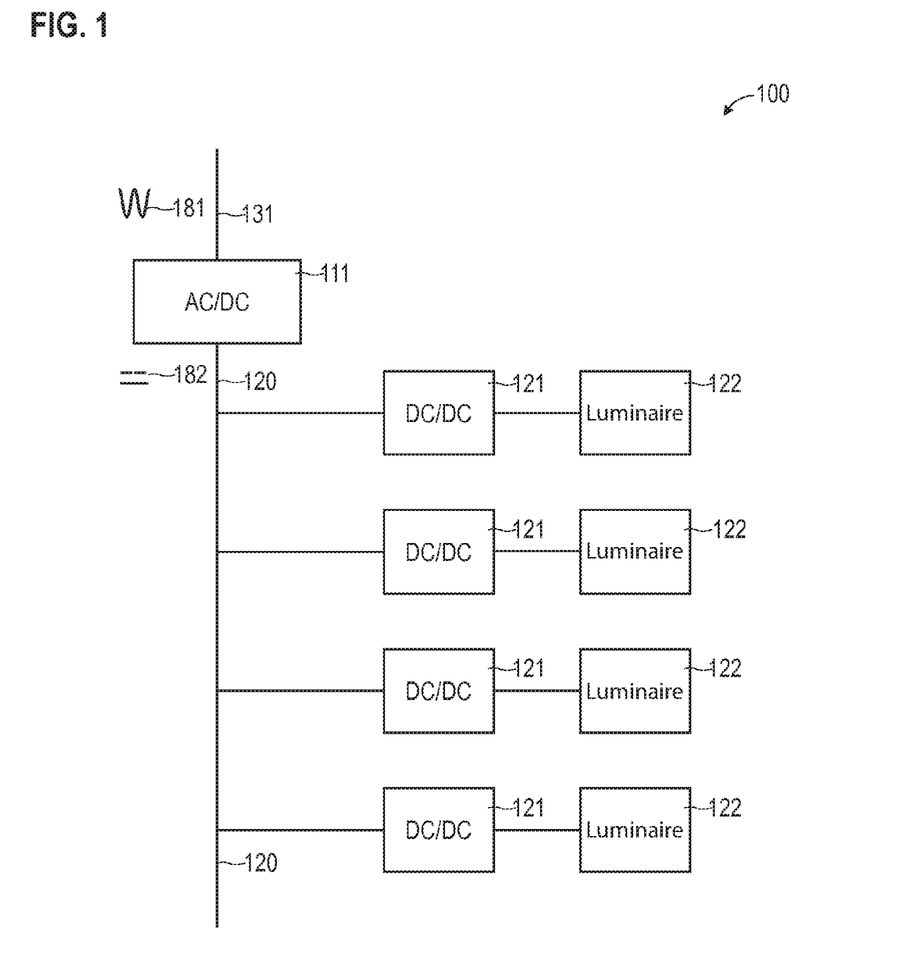
FIG. 1 schematically illustrates a lighting system with an AC/DC converter, a luminaire bus system, and a plurality of luminaires according to various examples.

FIG. 1 illustrates aspects with respect to a luminaire system 100. The luminaire system 100 comprises a network line 131 via which an AC supply voltage 181 is received. An operating device 111 comprises an AC/DC converter 1111 and converts the AC supply voltage 181 into an operating DC voltage 182. This operating DC voltage 182 is fed into a luminaire bus system 120 of the luminaire system 100.

The luminaire bus system 120 comprises a plurality of lines that are, for example, arranged in a star shape, annularly or otherwise and that lead to DC/DC converters 121. These DC/DC converters 121 are thus fed the operating DC voltage 182 originating from the AC/DC converter 1111. These DC/DC converters 121 can change the level of the operating DC voltage 182 to a value that allows the operation of luminaires 122 connected to the luminaire bus system 120. The DC/DC converters 121 can implement a power source function. The DC/DC converters can optionally provide dimmer functionality, for example. The luminaires 122 could, for example, be implemented by light-emitting diodes arranged on an LED module; the DC/DC converters 121 are then typically implemented as DC voltage converters, in particular step-down converters, inverting converters, or step-up converters, for example with a switching element, a free-running diode, and a storage choke. The DC/DC converters 121 can be integrated in the luminaire 122 or be arranged as an external module. The DC/DC converters 121 can, for example, be arranged on the LED module, i.e., on the same circuit board as the light-emitting diodes. In the example of FIG. 1, the luminaire system 100 comprises a number of four luminaires. However, it would in general be possible for the luminaire system 100 to comprise a larger or smaller number of luminaires 122. The DC/DC converters 121 can adjust the brightness of the respectively connected luminaire 122, for example the amplitude of the current through the light-emitting diodes. The adjustment of the brightness can, for example, take place depending on the specification of the dimmer level for the luminaires 122.

It has been observed that the power loss of the luminaire bus system 120 can assume different values for different amplitudes of the operating DC voltage 182. This can be utilized to optimize the power loss within the framework of a calibration of the operating DC voltage.

Figure 2:
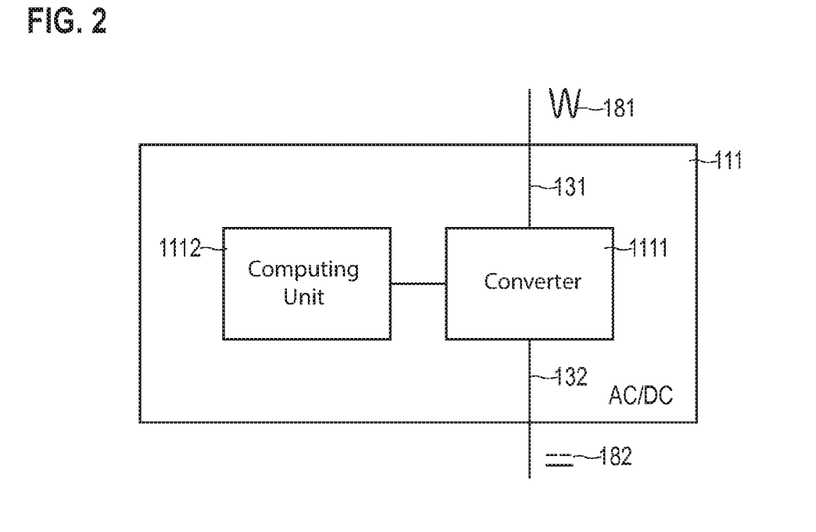
FIG. 2 schematically illustrates an AC/DC converter according to various examples.

FIG. 2 illustrates aspects with respect to the operating device 111. The operating device 111 comprises an AC/DC converter 1111. For example, the AC/DC converter could have a bridge rectifier with a plurality of diodes, a DC/DC converter, and a smoothing filter. The AC/DC converter 1111 is controlled by a computing unit 1112. The computing unit 1112 could, for example, control a switching frequency of a switching element of the AC/DC converter 1111. The computing unit 1112 could, for example, be implemented as a micro-controller, micro-processor, field-programmable array (FPGA), or an application-specific, integrated circuit (ASIC).

The computing unit 1112 can be designed to adjust the amplitude of the operating DC voltage 182 output by the AC/DC converter 1111 to the luminaire bus system 120. To this end, the operating device 111 could, for example, have a communication interface (not shown in FIG. 2) via which control data are received; the computing unit 1112 could then adjust the amplitude of the operating DC voltage 182 in accordance with the control data. The computing unit 1112 could alternatively or additionally receive a user input via a user interface and adjust the amplitude of the operating DC voltage 182 based thereon.

In the example of FIG. 2, the logic for adjusting the amplitude of the operating DC voltage 182 is arranged in the operating device 111. In other examples, this logic could also be arranged outside the operating device 111.

The DC/DC converters 121 could also be respectively controlled by a DC/DC computing unit (not shown). The DC/DC computing unit could, for example, control a switching frequency of a switching element of the DC/DC converter 121. The DC/DC computing unit could, for example, be implemented as a micro-controller, micro-processor, field-programmable array (FPGA), or an application-specific, integrated circuit (ASIC).

The DC/DC computing unit can be designed to adjust the amplitude of the operating DC voltage output by the DC/DC converter 121 to the luminaire 122. To this end, the DC/DC converter 121 could, for example, have a communication interface (not shown in FIG. 2) via which control data are received; the DC/DC computing unit could then adjust the amplitude of the operating DC voltage for the luminaire 122 in accordance with the control data. The DC/DC computing unit could alternatively or additionally receive a user input via a user interface and adjust the amplitude of the operating DC voltage for the luminaire 122 based thereon.

Figure 3:
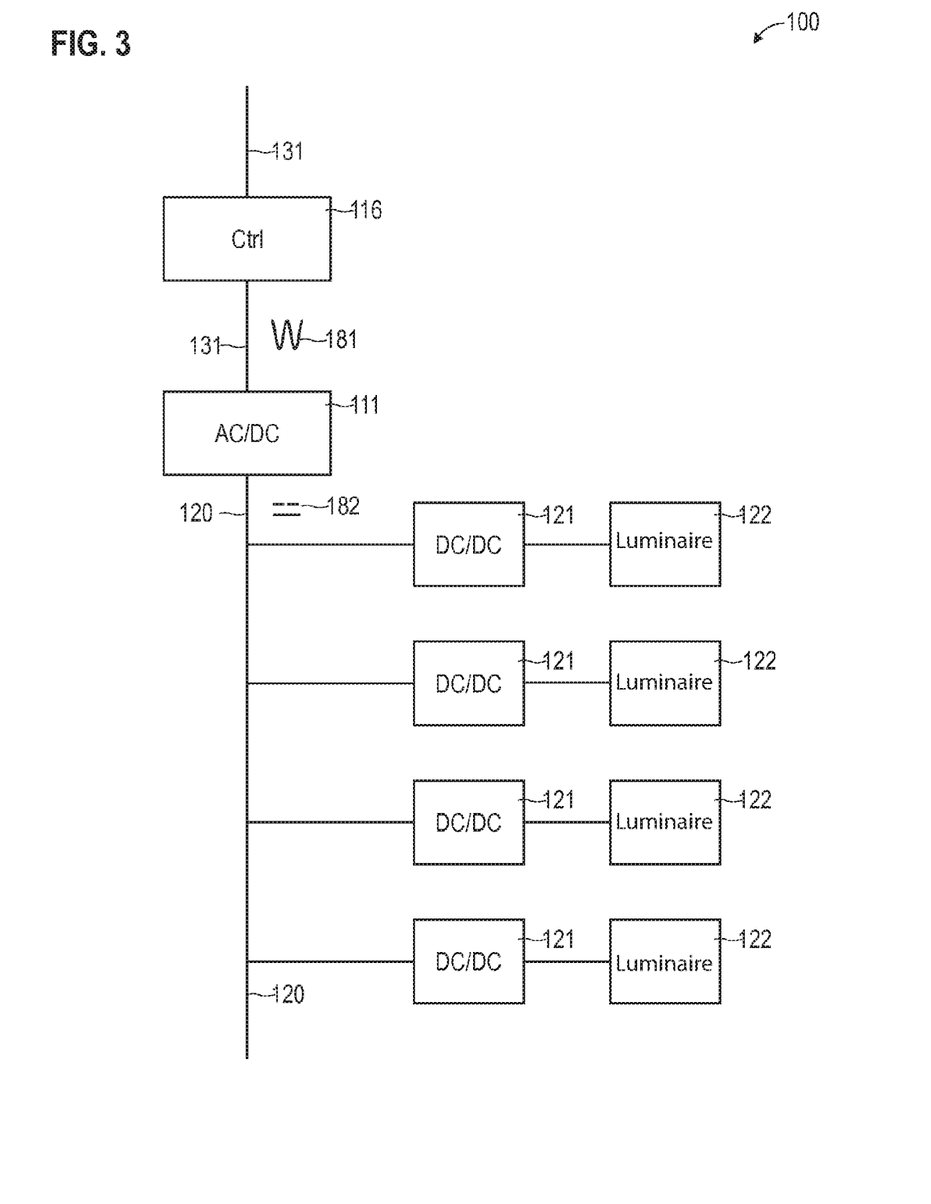
FIG. 3 schematically illustrates a lighting system with a control unit, an AC/DC converter, a luminaire bus system, and a plurality of luminaires according to various examples.

FIG. 3 illustrates aspects with respect to a luminaire system 100. The luminaire system 100 according to the example of FIG. 3 basically corresponds to the luminaire system 100 according to the example of FIG. 1. In the example of FIG. 3, the luminaire system 100 furthermore comprises a control device 116. The control device 116 in the example of FIG. 3 is also connected to the network line 131. The control device 116 could therefore send control data to the operating device 111 using PLC or receive control data from the operating device 111 using PLC. Other technologies for the communication between the control device 116 and the operating device 111 would however also be possible.

In the example of FIG. 3, the logic for adjusting the amplitude of the operating DC voltage 182 could be arranged in the control device 116. In this case, it can be unnecessary to provide a corresponding logic in the operating device 111.

Figure 4:
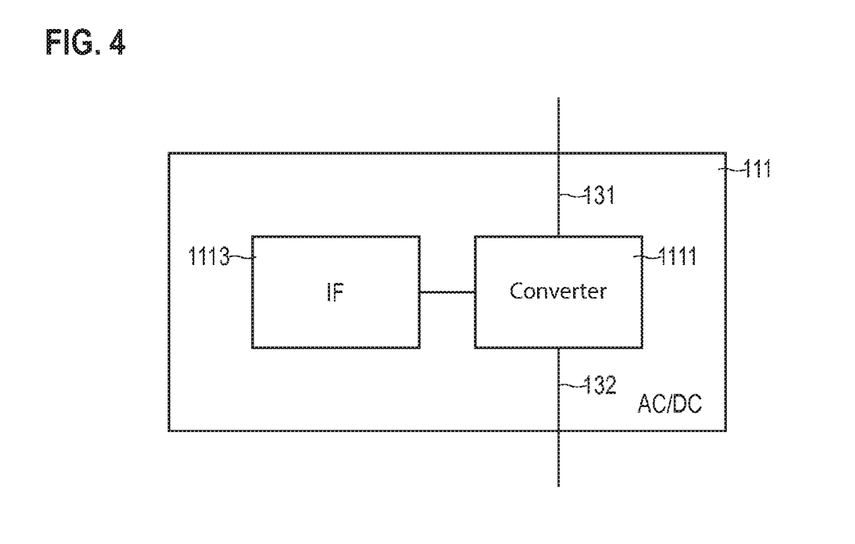
FIG. 4 schematically illustrates an AC/DC converter according to various examples.

FIG. 4 illustrates aspects with respect to the operating device 111. The operating device 111 in the example of FIG. 4 comprises a communication interface 1113; in the example of FIG. 4, the communication interface 1113 replaces the computing unit 1112 (cf. FIG. 2). For example, such a scenario according to the example of FIG. 4 could be desirable when a central control device 116 is provided which implements the logic functionality for controlling the AC/DC converter 1111. In this case, the corresponding control data could be forwarded by the control device 116 via the interface 1113 directly to the AC/DC converter 1111.

Figure 5:
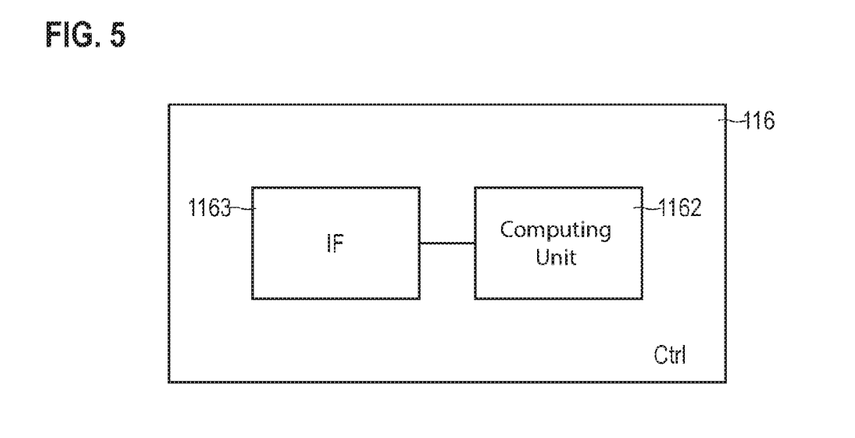
FIG. 5 schematically illustrates a control unit according to various examples.

FIG. 5 illustrates aspects with respect to the control device 116. The control device 116 comprises a computing unit 1162 and a communication interface 1163. The computing unit 1162 could, for example, implement the logic functionality with respect to the adjustment of the amplitude of the operating DC voltage, as described above, by controlling the AC/DC converter 1111 of the operating device 111. Corresponding control data could then be sent via the communication interface 1163 to the operating device 111. The computing unit 1162 could, for example, be implemented as a micro-controller, micro-processor, FPGA, or ASIC.

In the various examples described herein, the corresponding logic for adjusting the amplitude of the operating DC voltage 182 can be located in the control device 116 and/or in the operating device 111.

Figure 6:
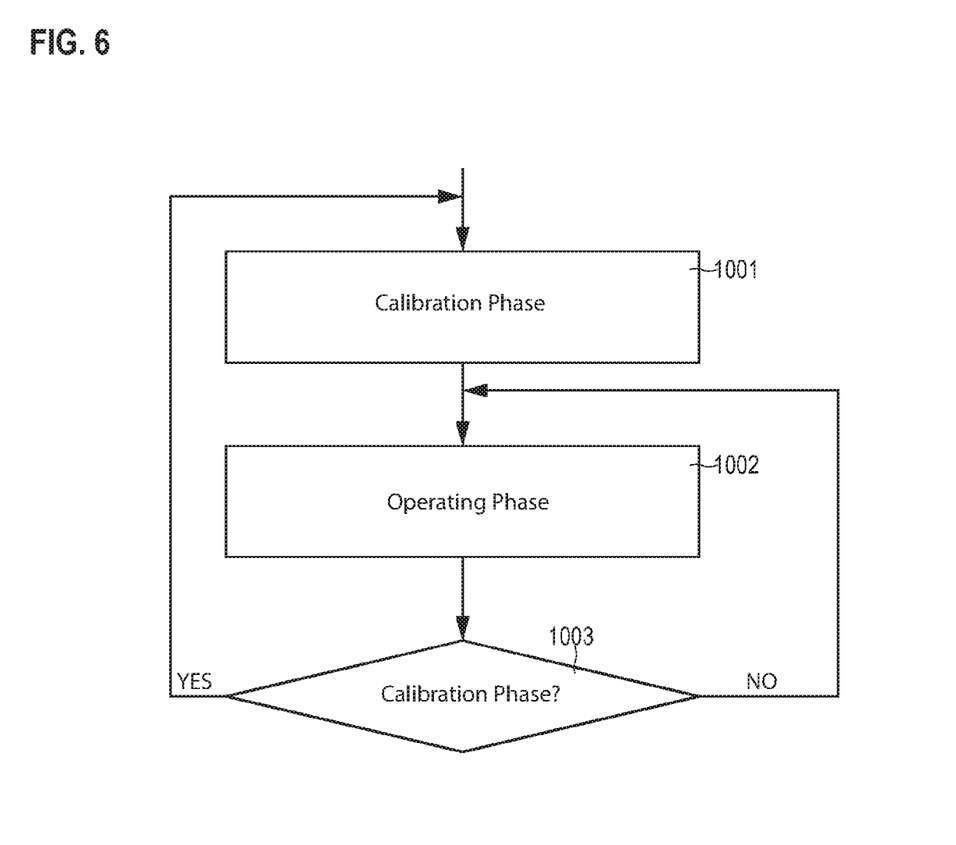
FIG. 6 is a flow diagram of a method according to various examples, wherein the method comprises the repeated switching between a calibration phase and an operating phase for a luminaire system.

FIG. 6 is a flow diagram of a method according to various examples. The method could, for example, be carried out by the computing unit 1112 or by the computing unit 1162.

The method starts with step 1001. Step 1001 could, for example, be triggered by an initialization of the luminaire bus system 120. This can correspond to the first start of the luminaire bus system 120, for example by connection to the network connector 131. In step 1001, a calibration phase is carried out. The calibration phase comprises the sequential feeding of a plurality of calibration DC voltages into the luminaire bus system 120. The calibration phase can make it possible to acquire measurement data which allow the empirical determination of a particularly desirable operating point of the AC/DC converter 1111 and of the/DC converters 121. To this end, a plurality of calibration DC voltages can be fed into the luminaire bus system during the calibration phase 1001, for example by suitable control of the AC/DC converter 1111 by means of the computing unit 1112 or the computing unit 1162 and of the/DC converters 121 by the DC/DC computing unit, and the output power or the power consumption of the luminaire bus system can be monitored. In this way, a particularly preferred operating point of the AC/DC converter 1111 and of the/DC converters 121 can then be determined. For example, the operating point that corresponds to a minimum power consumption of the luminaire bus system 120 could be determined.

In step 1002, an operating phase of the luminaire bus system 120 is then carried out. In the process, the operating phase can include the operation of the AC/DC converter 1111 and of the/DC converters 121 at the operating point determined previously in step 1001.

In step 1003, a check is performed as to whether an additional calibration phase is to be carried out. An additional calibration phase could, for example, be carried out when a dimmer level of the luminaires 122 was changed. This is based on the knowledge that the preferred operating point can be dependent on the dimmer level of the luminaires 122. The change of the dimmer level could, for example, be effected by the control unit 116 by means of corresponding control data.

In step 1003, the activity of a timer could, for example, also be monitored alternatively or additionally. In step 1003, a user input could, for example, also be evaluated alternatively or additionally. Other trigger criteria for the calibration phase in step 1001 are possible. As a result of step 1003, the calibration phase 1001 is triggered repeatedly and the operating point for the respectively following operating phase 1002 is repeatedly determined.

Figure 7:
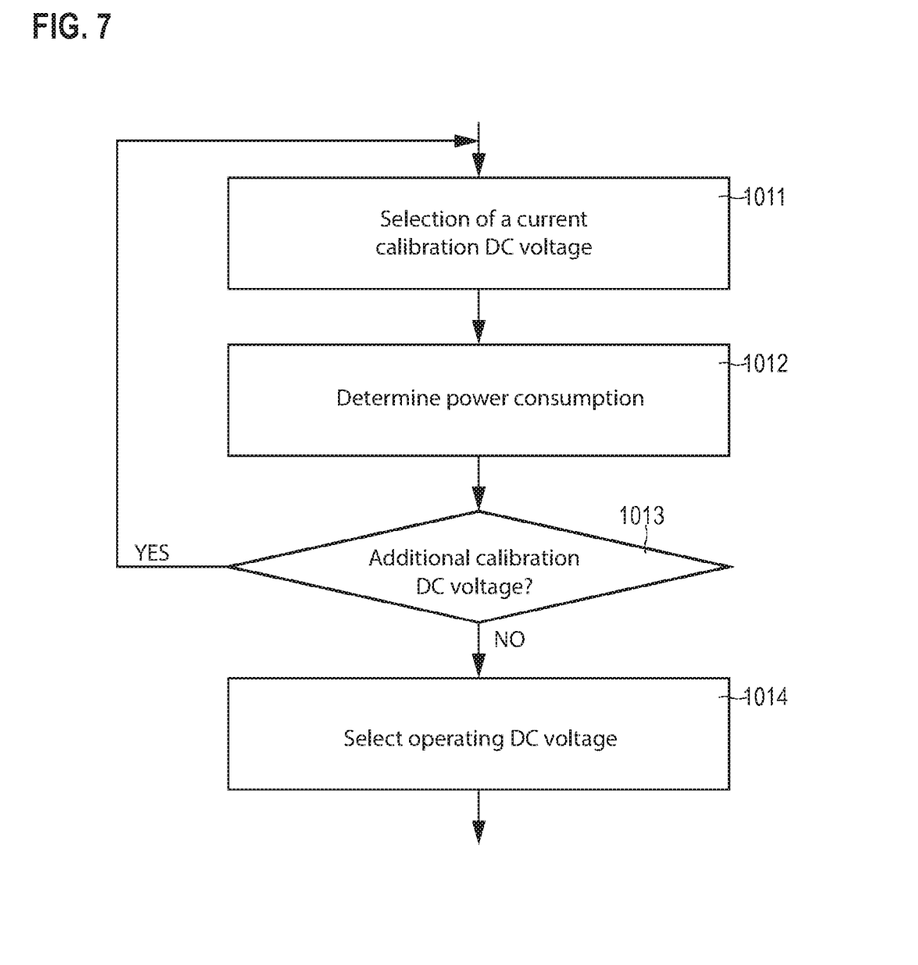
FIG. 7 is a flow diagram of a method according to various examples, wherein the method comprises the determination of a plurality of power consumptions at different calibration DC voltages.

FIG. 7 is a flow diagram of a method according to various examples. The method could, for example, be carried out by the computing unit 1112 or by the computing unit 1162. The method according to FIG. 7 could, for example, be carried out within the framework of step 1001 of FIG. 6, i.e., as a calibration phase.

In step 1011, a current calibration DC voltage is first selected. The calibration DC voltage could be selected in step 1011 by an optimization algorithm that samples a given parameter space of calibration DC voltages. In other implementations, the calibration DC voltage could also be predetermined within the framework of a list to be processed.

In step 1012, the power consumption of the luminaire bus system 120 is then determined. The power consumption, determined in step 1012, of the luminaire bus system 120 is associated with the calibration DC voltage selected in step 1011. For example, a corresponding current/voltage measurement can be carried out.

In step 1013, a check is performed as to whether an additional calibration DC voltage is to be selected. This could again take place by means of an optimization algorithm. In other implementations, a check could be performed as to whether all calibration DC voltages of a list to be processed were taken into account in previous iterations of steps 1011, 1012.

If the decision was made in step 1013 that an additional calibration DC voltage is to be taken into account, steps 1011 and 1012 are carried out again. Otherwise, step 1014 is carried out. In step 1014, the operating point for the operation of the luminaire bus system 120 is determined. In the process, the power consumptions, determined in the various iterations of step 1012, of the luminaire bus system 120 are taken into account. For example, the calibration DC voltage that is associated with a minimum power consumption of the luminaire bus system 120 could be selected in a simple implementation. In another implementation, the operating point could be determined in step 1014 within the framework of an optimization of the power loss of the luminaire bus system. For example, this could mean that the calibration DC voltage selected in the current iteration of step 1011 fulfills an abort criterion of the optimization and is therefore selected in step 1014 as operating DC voltage.

Figure 8:
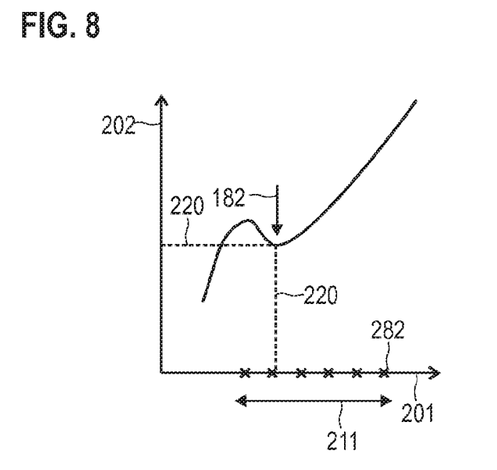
FIG. 8 schematically illustrates the power loss for various operating DC voltages that are fed into a luminaire bus system according to various examples.

FIG. 8 illustrates aspects with respect to the determination of the operating point for the operation of the luminaire bus system 120. FIG. 8 shows the power loss 202 of the luminaire bus system 202 as a function of the DC voltage 201 output by the AC/DC converter 1111.

FIG. 8 in particular shows a parameter space 211 which is basically accessible within the framework of a proper operation of the luminaires 122. This parameter space 211 is sampled by various calibration DC voltages 282. The parameter space 211 could, for example, be predetermined by certain boundary conditions. The parameter space 211 could, for example, be restricted by certain requirements of the DC/DC converters 121.

In the example of FIG. 8, the various calibration DC voltages 282 are evenly distributed over the parameter space 211. In other examples, it would however also be possible for the determination of the operating point 220 to include an optimization of the power loss 202 of the luminaire bus system 120, wherein the parameter space 211 can, for example, be sampled particularly quickly within the framework of the optimization by deliberate variation of the calibration DC voltages 282.

FIG. 8 shows that the power loss 202 has a minimum within the parameter space 211. This minimum defines the operating point 220 at which the AC/DC converter 1111 of the operating device 111 is to be operated subsequently. For example, the operating point 220 could be characterized by the corresponding operating DC voltage 182; i.e., the operating point 220 could explicitly describe the corresponding operating DC voltage 182 (vertical arrow in FIG. 8; vertical dashed line in FIG. 8). In other examples, it could however also be possible for the operating point to describe a target power consumption of the luminaire bus system 120 (horizontal dashed line in FIG. 8). In such an example, the AC/DC converter 1111 could be controlled to feed the operating DC voltage 182 in a regulated manner, i.e. by means of a control loop. In the process, a reference variable that is determined based on the target power consumption could, for example, be used. The operating DC voltage 182 could moreover be used as control variable, i.e. be changed during the operating phase.

Analogously, an analysis of the entire system comprising the AC/DC converter 1111 and the DC/DC converters 121 could also take place. In the process, the power losses for both the AC/DC converter 1111 and the DC/DC converters 121 for the various calibration DC voltages 282 can be detected. It would thus also be possible for the determination of the operating point 220 to include an optimization of the power loss 202 of the luminaire bus system 120, wherein the power loss of both the AC/DC converter 1111 and the DC/DC converters 121 is, for example, detected and evaluated within the framework of the optimization.

Figure 9:
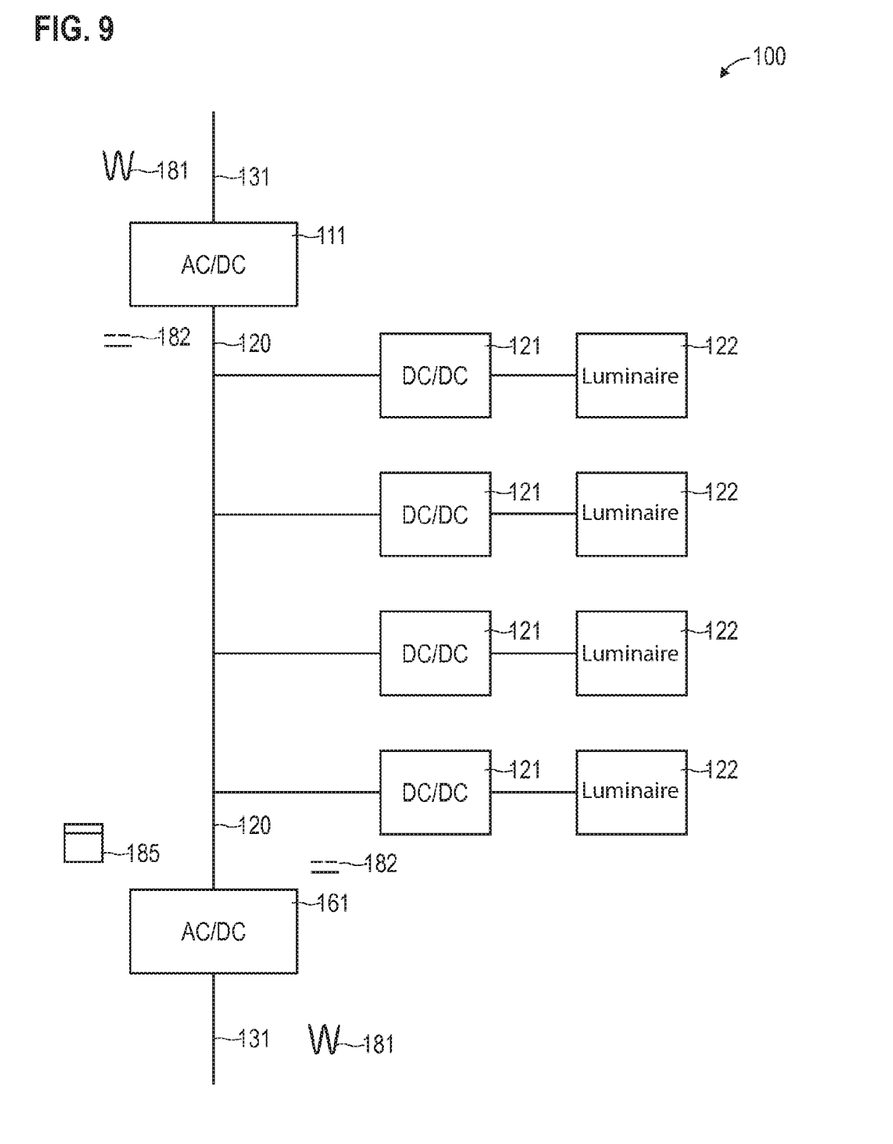
FIG. 9 schematically illustrates a lighting system with two AC/DC converters, a luminaire bus system, and a plurality of luminaires according to various examples.

FIG. 9 illustrates aspects with respect to a luminaire system 100. The luminaire system 100 according to the example of FIG. 9 basically corresponds to the luminaire system 100 according to the example of FIG. 1.

In the example of FIG. 9, the lighting system 100 comprises an additional operating device 161. The additional operating device 161 can be configured in accordance with the operating device 111 (cf. FIGS. 2 and 4, for example). The additional operating device 161 is also designed to feed an operating DC voltage 182 into the luminaire bus system 120.

In the example of FIG. 9, the lighting system 101 does not comprise a control unit 116; it would however also be possible for the lighting system 100 to comprise a control unit 116. This control unit can then control both operating devices 111, 161.

The lighting system 100 could also have a larger number of operating devices 111, 161.

The DC voltage output by the AC/DC converter of the additional operating device 161 extends the parameter space 211 for determining the operating point 220 of the AC/DC converter 1111 of the operating device 111; the (total) power loss and/or power consumption 202 can in particular also be dependent on the DC voltage output by the AC/DC converter of the additional operating device 161. For this reason, it can be possible for the operating point 220 of the AC/DC converter 111 also to be determined based on a power consumption of the luminaire bus system 120, said power consumption being associated with the additional operating device 161. This power consumption can be determined empirically by corresponding calibration DC voltages; to this end, a current/voltage measurement can, for example, also be carried out at the operating device 161.

It can in particular be possible for the AC/DC converter of the additional operating device 161 also to be controlled to feed a plurality of calibration DC voltages sequentially into the luminaire bus system 120 during the calibration phase. This can again take place based on an optimization, for example, or deterministically by processing a corresponding list, for example.

The operating devices 111, 161 can in particular be operated in a synchronized manner during the calibration phase. This means that pairs of calibration DC voltages that are respectively fed by the AC/DC converter of the operating device 111 and the AC/DC converter of the additional operating device 161 into the luminaire bus system 120 are defined, for example. Switching between different phases can then take place in a chronologically synchronized manner. In this way, the parameter space 211 can be sampled in a targeted manner.

In order to achieve such a synchronization between the operating devices 111, 161, control data 185 can be transmitted. The control data 185 could, for example, be transmitted between the operating devices 111, 161. The control data 185 could also be transmitted by a central control unit 116 to the operating devices 111, 161. PLC can be used. The control data 116 could, for example, contain time stamps which describe when corresponding calibration DC voltages are to be fed in. The reception of control data 116 could trigger the switching between various calibration DC voltages.

The operating point 220 of the AC/DC converter 1111 of the operating device 111 can then be determined within the framework of a global optimization of the power loss and/or the power consumption 202; this means that the parameter space of the optimization also takes into account a variation of the DC voltage produced by the AC/DC converter of the additional operating device 161. This parameter space can again be sampled in a targeted manner by the optimization.

Such technologies for determining the operating point 220 of the AC/DC converter 1111 of the operating device 111 can basically also be used to determine the operating point of the AC/DC converter of the operating device 161. Different operating points for the different operating devices 111, 161 can then generally be obtained.

Within the course of the determination of the optimal operating point, a selection can be made as to which operating device 111, 161 is used for outputting the DC voltage. For example, the operating device 111, 161 that has the lowest losses can be automatically used for outputting the DC voltage. Alternatively, a user can also decide which operating device 111, 161 is to be used for outputting the DC voltage.

Naturally, the features of the above-described embodiments and aspects of the invention can be combined. In particular, the features can be used not only in the described combinations but also in other combinations or separately without leaving the field of the invention.

The invention claimed is:

1. A method of providing an operating DC voltage to a luminaire bus system (120), the method comprising the steps of:
   providing an AC/DC converter (111, 161) that receives AC power and outputs DC power at an operating voltage and is capable of adjusting an amplitude of the operating voltage, the luminaire bus system that receives the outputted DC power from the AC/DC converter and supplies the outputted DC power to multiple DC/DC converters which in turn supply DC power to one or more luminaires associated with a respective DC/DC converter of the multiple DC/DC converters;
   controlling the AC/DC converter (111, 161) to feed a plurality of calibration DC voltages (282) sequentially into the luminaire bus system (120) and to the multiple DC/DC converters (121), said plurality of calibration DC voltages falling within a parameter space defined by requirements for the multiple DC/DC converters;
   for each calibration DC voltage (282) of the plurality of calibration DC voltages, determining a corresponding power consumption (202) of the AC/DC converter (111);
   after determining the corresponding power consumption for each calibration DC voltage, determining whether to feed another calibration DC voltage from the AC/DC converter into the luminaire bus system and to the plurality of DC/DC converters;
   determining an operating point (220) of the AC/DC converter (111, 161) based on the determined corresponding power consumptions (202); and
   controlling the AC/DC converter (111, 161) to feed an operating DC voltage (182) into the luminaire bus system (120) and to the multiple DC/DC converters in accordance with the determined operating point (220).

2. The method according to claim 1, wherein the determination of the operating point (220) comprises an optimization of power loss (202) of the AC/DC converter, the luminaire bus system (120), the multiple DC/DC converters and the one or more associated luminaires.

3. The method according to claim 1,
   wherein a calibration phase (1001) comprises the controlling of the AC/DC converter (111, 161) to feed the plurality of calibration DC voltages (282) sequentially,
   wherein an operating phase (1002) comprises the controlling of the AC/DC converter (111, 161) to feed the operating DC voltage (182), and
   wherein the method furthermore comprises:
   repeated triggering of the calibration phase (1001) and repeated determination of the operating point (220) for a respectively subsequently triggered operating phase (1002).

4. The method according to claim 1, wherein the controlling of the AC/DC converter (111, 161) to feed the plurality of calibration DC voltages (282) sequentially is triggered by an initialization of the luminaire bus system (120).

5. The method according to claim 1, wherein the controlling of the AC/DC converter (111, 161) to feed the plurality of calibration DC voltages (282) sequentially is triggered by changing a dimmer level of luminaires connected to the luminaire bus system (120).

6. The method according to claim 1, furthermore comprising:
   controlling an additional AC/DC converter (111, 161) to feed a plurality of additional calibration DC voltages (282) sequentially into the luminaire bus system (120); and
   for each of the plurality of additional calibration DC voltages (282), determining a corresponding additional power consumption (202) of the additional AC/DC converter (161);
   wherein the operating point (220) of the additional AC/DC converter (111, 161) is furthermore determined based on the additional determined power consumptions (202).

7. The method according to claim 6, furthermore comprising:
   transmitting control data to at least one interface (1113) associated with the AC/DC converter (111, 161) and to an additional interface (1113) associated with the additional AC/DC converter (111, 161), wherein the control data bring about a synchronization of the controlling of the AC/DC converter (111, 161) to feed the plurality of calibration DC voltages (282) and of the controlling of the additional AC/DC converter (111, 161) to feed the plurality of additional calibration DC voltages (282).

8. The method according to claim 6, wherein the determination of the operating point (220) of the AC/DC converter (111, 161) comprises a global optimization of power loss (202) by the AC/DC converter (111, 161) and the additional AC/DC converter (111, 161).

9. The method according to claim 6, furthermore comprising:
   determining an additional operating point (220) of the additional AC/DC converter (111, 161) based on the determined power consumptions (202) and also based on the additional determined power consumptions (202); and
   controlling the additional AC/DC converter (111, 161) to feed an additional operating DC voltage (182) into the luminaire bus system (120) in accordance with the additional determined operating point (220);
   wherein the operating point (220) of the AC/DC converter (111, 161) differs from the operating point (220) of the additional AC/DC converter (111, 161).

10. The method according to claim 1, wherein the operating point (220) explicitly describes the operating DC voltage (182).

11. The method according to claim 1,
    wherein the operating point (220) describes a target power consumption of the luminaire bus system (120); and
    wherein the controlling of the AC/DC converter (111, 161) to feed the operating DC voltage (182) takes place in a regulated manner with a reference variable determined based on the target power consumption and the operating DC voltage (182) as control variable.

* * * * *